United States Patent Office 3,767,621
Patented Oct. 23, 1973

3,767,621
PROCESS OF PREPARING POLYESTERS FROM HYDROXYBENZOIC ACIDS AND DERIVATIVES, AND POLYESTER PRODUCT PREPARED THEREFROM
Mamoru Suzuki, Toyonaka, Mikio Hayashi, Nishinomiya, Kazuo Hieda, Akashi, Yoshiro Murata and Motomasa Ohsu, Minoo, Kazumi Yoshigoe, Takarazuka, and Norio Kotera, Amagasaki, Japan, assignors to Sumitomo Chemical Company, Limited, Osaka, Japan
No Drawing. Filed Dec. 27, 1971, Ser. No. 212,695
Claims priority, application Japan, Dec. 29, 1970, 46/124,422
Int. Cl. C08g 17/02
U.S. Cl. 260—47 C    4 Claims

ABSTRACT OF THE DISCLOSURE

Polyesters are produced by polymerizing a monomer compound represented by the general formula

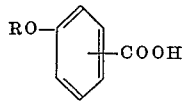

where R represents a hydrogen atom of a group

R' being an alkyl group having 1 to 3 carbon atoms, a phenyl group or a substituted phenyl group by polycondensation without using any catalyst. The polymerization can be carried out by solution condensation, melt condensation or solid phase condensation. The present polyesters have a good color tone and good electrical properties, and are readily applicable to fibers, films, paints or plastics.

---

This invention relates to a process for producing polyesters, and more particularly to a process for producing polyesters, which comprises polymerizing a compound represented by the Formula I:

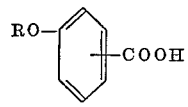
(I)

wherein R represents a hydrogen atom or a group

R' being an alkyl group having 1 to 3 carbon atoms, a phenyl group or a substituted phenyl group, by polycondensation without using any catalyst. In the present invention, the compound of the Formula I includes o-, m- and p-isomers and a mixture thereof.

Herefore, various attempts have been proposed to produce polyesters from hydroxybenzoic acid as a starting material. For example, German Pat. No. 344,034 discloses a process based on the use of an acid condensing agent such as acetic anhydride, phosgene, phosphorus oxychloride, thionyl chloride, etc. but high molecular weight polymers have hardly been produced.

U.S. Pat. No. 2,600,376 discloses a process based on the reaciton between hydroxybenzoic acid and acetic anhydride, and polymerization with use of catalysts such as $ZnCl_2$, $ZnO$, $CuO$, etc. after distilling-off acetic acid, the polymerization being conducted at 200° to 250° C. under 0.01 to 0.05 mm. Hg.

U.S. Pat. No. 3,039,994 discloses a process based on polycondensation of methyl p-acetoxybenzoate using a tert. amine having a boiling point of 150° C. or higher as a catalyst as well as a solvent at 200° to 225° C., whereby polyesters having a melting point of about 450° C. have been produced.

British patent specification No. 1,173,121 discloses a process based on polycondensation of hydroxybenzoic acid ester in a solvent having a high boiling point, for example, 300° C. or higher, such as polyphenyl halide, polyphenyl ether, etc., using a catalyst, Ti(OBu)$_4$ at 250° to 360° C., whereby high molecular weight polyesters have been produced.

The present inventors have studied these prior art processes and have clarified the following points:

The processes based on the use of high boiling point solvents or tert. amines have such disadvantages that much prolonged reaction time is required and coloring of the formed polymers takes place to a considerable degree.

In the process disclosed in U.S. Pat. No. 2,600,376, a metal compound is used, and consequently the formed polymers are colored. By reducing the amount of the metallic compound, coloring can be somewhat eliminated, but cannot be completely prevented.

The present inventors have made various studies on a process for producing polyesters having a good appearance, especially good color tone, within a short period of time, and have accomplished the present invention.

According to the present invention, the monomer having the Formula I is subjected to polycondensation in the absence of catalysts, whereby high molecular weight polymers having a good color tone can be obtained. The present invention is based on a novel acknowledgement that the monomer having the Formula I not only serves as a component of the polymer, but also acts as a catalyst. The polymer obtained according to the present invention contains no metallic compound, because no metallic compounds are used as the catalyst in the present invention, though these compounds have been heretofore used in the prior art process. That is, the polymers of the present invention have improved electrical properties which cannot be possessed by the polymers of the prior art processes. In other words, the polymers of the present invention can be utilized in the specific fields of application in view of the improved electrical properties.

In carrying out the present invention, the polycondensation of the monomer having the Formula I can be effected by solution condensation, melt condensation, or solid phase condensation. The conditions for the polycondensation are not restricted in the present invention. For example, the polymer can be produced in the following manners:

A predetermined amount of the monomer having the Formula I is heated at 100° to 250° C. under the atmospheric pressure or a reduced pressure of 760 to 50 mm. Hg in an inert gas stream, and after ROH in which R is as defined above, condensate has been formed 40% or higher, or preferably 70% or higher, based on the theoretical amount, the pressure of the reaction system is gradually further reduced, and finally to 10 mm. Hg or less. Heating is continued at 150° to 300° C. under the reduced pressure for 1 to 30 hours, whereby the polycondensation reaction is completed.

Alternatively, a predetermined amount of the monomer having the Formula I is heated under the atmospheric pressure or a somewhat reduced pressure in a high boiling solvent having a boiling point of 250° C. or higher and never inhibiting the condensation reaction, such as dimethylnaphthalene, triaryldimethanes, triphenyl, biphenyl chlorides and a mixture of diphenyl oxide and diphenyl, in an inert gas stream. The polycondensation is conducted at a temperature of 150° C. or higher, or under reflux for 1 to 30 hours, while removing ROH in which R is as defined above.

As the reaction proceeds, the polymer precipitates from the reaction system. The precipitated polymers are filtered off, washed, and then dried, whereby polymer powders are obtained. When the polymers are still dissolved in the system at the time of completion of the reaction, the content of the system is poured into a polymer-insoluble solvent to deposit polymer powders. The precipitated polymers are filtered off and washed and then dried, whereby polymer powders are obtained.

The thus obtained polymers have a high degree of polymerization, and are almost colorless, and readily applicable to fibers, films, paints or plastics.

The present invention will be explained by referring to examples.

EXAMPLE 1

90.0 grams (0.5 mole) of m-acetoxybenzoic acid was heated under the atmospheric pressure at 180° to 220° C. for 2 hours in a nitrogen gas stream. When 70 to 80% of acetic acid was distilled off, based on the theoretical amount, the pressure of the reaction system was gradually reduced, while heating the system at 220° C. Heating was continued under 0.1 mm. Hg for 3 to 4 hours, and the reaction solution became viscous. After the completion of the reaction, tetrachloroethane was added to the system to dissolve the resulting polymer. Then, the resulting solution was poured into a large amount of methanol. The thus deposited precipitates were filtered off, further washed with methanol and dried, whereby white polymer powders were obtained in 98% yield. The intrinsic viscosity of the thus obtained polymer was 0.41 at 30° C. in tetrachloroethane solvent.

EXAMPLE 2

72.0 grams (0.4 mole) of m-acetoxybenzoic acid and 36.0 g. (0.2 mole) of p-acetoxybenzoic acid were heated at 180° to 230° C. under the atmospheric pressure in a nitrogen gas stream for two hours. When 80% of acetic acid was distilled off, based on the theoretical amount, the pressure of the reaction system was reduced, and the reaction was continued at 240° C. under a pressure of 0.1 mm. Hg for three hours. The reaction solution became viscous. After the completion of the reaction, the resulting solution was treated in the same manner as in Example 1, whereby white polymer powders were obtained in 94% yield. The intrinsic viscosity of the thus obtained polymers was 0.49 at 30° C. in tetrachloroethane solvent.

The resulting polymers were dissolved in a solvent, and the resulting solution was applied onto a mild steel plate, tin plate, aluminum plate, etc. and baked, whereby coating films having a good adhesion, good flexibility and good hardness were obtained.

EXAMPLE 3

90.0 grams (0.5 mole) of p-acetoxybenzoic acid was heated under the atmospheric pressure at 200° to 220° C. in a nitrogen gas stream for two hours. When the distilling-off amount of acetic acid became little, the pressure of the reaction system was reduced, and then the reaction was continued under a pressure of 0.1 mm. Hg at 220° to 280° C. for three hours. White precipitates were formed in the system even at the completion of the heating under the atmospheric pressure, and the solution was almost converted to white solid after the pressure of the system was reduced. The heating was continued, while making said white, solidified polymer fine particles having diameters of about 0.8 mm.

The resulting polymers were not dissolved in the ordinary solvent such as tetrachloroethane, cresol, etc., and had not a sharp melting point. That is, the polymers were a polyester, which started to undergo gradual decomposition at 530° C. This was confirmed by infrared absorption spectrum and elemental analysis. The polymer yield was 92%.

EXAMPLE 4

69.0 grams (0.5 mole) of m-hydroxybenzoic acid was heated under the atmospheric pressure at 200° to 240° C. in a nitrogen gas stream for 5 hours. When 70% of water was distilled off, based on the theoretical amount, the pressure of the system was reduced, and the reaction was continued at 240° C. under a pressure of 0.1 mm. Hg for 3 hours. The reaction solution became viscous. After the completion of the reaction, the resulting solution was treated in the same manner as in Example 1, whereby white polymer powders were obtained in 86% yield. The intrinsic viscosity of the thus obtained polymers was 0.33 at 30° C. in tetrachloroethane solvent.

EXAMPLE 5

90.0 grams (0.5 mole) of m-acetoxybenzoic acid was heated in 250 g. of a high boiling solvent consisting of 26.5% diphenyl and 73.5% diphenyl oxide under the atmospheric pressure at 200° to 255° C. for 10 hours in a nitrogen gas stream, and the by-product acetic acid was distilled off. The reaction proceeded in the homogeneous solvent system, and polymers were never deposited. After the completion of the reaction, the reaction solution was poured into xylene, and the resulting polymer precipitates were filtered off, washed and dried, whereby white polymer powders were obtained in 95% yield. The intrinsic viscosity of the thus obtained polymers was 0.65 at 30° C. in tetrachloroethane.

The resulting polyesters were melt-spun, and stretched, whereby fibers having a high tenacity were obtained. Likewise, by biaxially stretching a sheet of the polyester, a film having a high tenacity was obtained.

EXAMPLE 6

54.0 grams (0.3 mole) of m-acetoxybenzoic acid and 54.0 g. (0.3 mole) of p-acetoxybenzoic acid were heated in 300 g. of a high boiling solvent consisting of 26.5% diphenyl and 73.5% diphenyl oxide under the atmospheric pressure at 200° to 255° C. in a nitrogen gas stream. After 2 to 4 hours from the start of distilling-off of acetic acid, the reaction system became unclear, and while precipitates started to form. The reaction was further continued for 3 to 4 hours, and when the distilling-off of acetic acid was stopped, the reaction was discontinued. The resulting reaction solution was poured into a large amount of acetone, and the resulting polymer precipitates were filtered off, thoroughly washed and dried, whereby white polymer powders were obtained in 91% yield. The resulting polymers were soluble in tetrachloroethane, cresol, o-chlorophenol, etc., while leaving insolubles partially, and were a polymer, which melted at 220° to 300° C. and started to undergo gradual decomposition at 420° C. This was confirmed by infrared absorption spectrum and elemental analysis.

EXAMPLE 7

32.4 grams (0.18 mole) of m-acetoxybenzoic acid and 75.6 g. (0.42 mole) of p-acetoxybenzoic acid were heated in 300 g. of a high boiling point solvent (triphenyldimethane) under the atmospheric pressure at 200° to 250° C. for 2 to 3 hours in a nitrogen gas stream. When the reaction system became unclear and the precipitates were formed, the reaction temperature was gradually increased and kept at 300° C. When the distilling-off of acetic acid was stopped, the reaction was discontinued. The resulting reaction solution was treated in the same manner as in Example 6, whereby white polymer powders were obtained in 92% yield. The thus obtained polymers were almost insoluble in the ordinary solvent such as tetrachloroethane, cresol, o-chlorophenol, etc., and were a polyester which had no sharp melting point and started to undergo gradual decomposition at 450° C.

This was confirmed by infra-red absorption spectrum and elemental analysis.

What is claimed is:
1. A process for producing polyesters, which comprises polymerizing a monomer compound represented by the formula

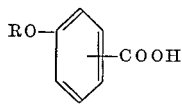

wherein R represents a hydrogen atom or a group

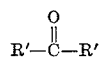

R' being an alkyl group having 1 to 3 carbon atoms or a phenyl group, without using any catalyst,
  by heating the monomer compound at 100° C. to 250° C. in an inert gas stream under a pressure of 760 to 50 mm. Hg until an amount of the condensate ROH in which R is as defined above, reaches 40% or higher based on the theoretical amount, and
  heating the resultant mixture at 150° C. to 300° C. under a reduced pressure of 10 mm. Hg or less for 1 to 30 hours, or
  by heating the monomer compound under atmospheric pressure or a somewhat reduced pressure in a solvent which has a boiling point of 250° C. or higher and which is inert to the condensation reactor, at a temperature between 150° C. and a reflux temperature for 1 to 30 hours in an inert gas.

2. A process according to claim 1, wherein the solvent is dimethylnaphthalene, triaryldimethanes, triphenyl, biphenyl chlorides, or a mixture of diphenyl oxide and diphenyl.

3. Polyesters obtained by the process claimed in claim 1.

4. The process of claim 1, wherein the amount of the condensate ROH reaches 70% based on the theoretical amount.

References Cited
UNITED STATES PATENTS 3,549,593  12/1970  Takekoshi _____ 260—47
2,728,747  12/1955  Aelony et al. _____ 260—78.3
3,039,994  6/1962  Gleim _____ 260—47

LESTER L. LEE, Primary Examiner

U.S. Cl. X.R.

117—132 C; 260—33.2 R, 33.4 P, 33.6 R, 33.8 R